(12) United States Patent
Vange et al.

(10) Patent No.: US 7,143,195 B2
(45) Date of Patent: Nov. 28, 2006

(54) HTTP REDIRECTOR

(75) Inventors: Mark Vange, Toronto (CA); Glenn Sydney Wilson, Toronto (CA); Michael Kouts, Toronto (CA); Marc Plumb, Toronto (CA); Alexandr Chekhovtsov, Brampton (CA)

(73) Assignee: Circadence Corporation, Boulder, CO (US)

( * ) Notice: Subject to any disclaimer, the term of this patent is extended or adjusted under 35 U.S.C. 154(b) by 661 days.

(21) Appl. No.: 09/835,939

(22) Filed: Apr. 16, 2001

(65) Prior Publication Data

US 2002/0023159 A1    Feb. 21, 2002

Related U.S. Application Data

(60) Provisional application No. 60/197,490, filed on Apr. 17, 2000.

(51) Int. Cl.
*G06F 15/16* (2006.01)
*G06F 15/167* (2006.01)

(52) U.S. Cl. .................. 709/249; 709/203; 709/213

(58) Field of Classification Search ........... 709/203, 709/219, 228, 213, 249; 345/745
See application file for complete search history.

(56) References Cited

U.S. PATENT DOCUMENTS

| | | | |
|---|---|---|---|
| 5,258,983 A | 11/1993 | Lane et al. | |
| 5,673,322 A | 9/1997 | Pepe et al. | |
| 5,757,771 A | 5/1998 | Li et al. | |
| 5,933,412 A | 8/1999 | Choudhury et al. | |
| 5,951,694 A | 9/1999 | Choquier et al. | |
| 5,999,971 A * | 12/1999 | Buckland ............ | 709/218 |
| 6,006,264 A | 12/1999 | Colby et al. | |
| 6,014,686 A * | 1/2000 | Elnozahy et al. ....... | 709/202 |
| 6,023,456 A | 2/2000 | Chapman et al. | |
| 6,034,964 A | 3/2000 | Fukushima et al. | |
| 6,073,241 A * | 6/2000 | Rosenberg et al. ....... | 713/201 |
| 6,167,449 A | 12/2000 | Arnold et al. | |
| 2002/0007317 A1* | 1/2002 | Callaghan et al. ........ | 705/26 |

FOREIGN PATENT DOCUMENTS

| | | |
|---|---|---|
| EP | 0384339 A2 | 8/1990 |
| EP | 0794491 A2 | 9/1997 |

(Continued)

OTHER PUBLICATIONS

Business Wire. "VR-1, Inc. to Release an Updated Version of its Vr-1 Conductor Networking Technology at the Tokyo Game Show", released Oct. 8, 1998 from Boulder, Colorado, 2 pages.*

(Continued)

*Primary Examiner*—David Wiley
*Assistant Examiner*—George C. Neurauter, Jr.
(74) *Attorney, Agent, or Firm*—Stuart T. Langley; Kent A. Lembke; Hogan & Hartson

(57) ABSTRACT

A system and method for managing state information between processes in different domains, and, more particularly, to software, systems and methods for determining and updating state information using hypertext transfer protocol (HTTP) cookies. A state management server manages priority information based on the priority of content requested by a user agent from a number of different domains. In a preferred embodiment, domain-specific state information is collected by a plurality of front-ends operating in dynamically assigned domains, and reported to the state management server which operates in a statically assigned domain. Preferably, the state management server causes the global priority information to be stored on a client device, such as a computer, in the form of a global cookie.

18 Claims, 10 Drawing Sheets

FOREIGN PATENT DOCUMENTS

| | | |
|---|---|---|
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |

OTHER PUBLICATIONS

Buisness Wire. "Hasbro Interactive to License VR-1's Online Gaming Technologies", released Jan. 21, 2999, from Boulder, Colorado, 2 pages.*

Software Development Conference Group. "The Computer Game Developers Conference (CGDC)—Show—Expo", publicly posted May 7, 1998, <http://web.archive.org/web/19980415145938/www.cgdc.com/expo_des4.htm>, 9 pages.*

K. Sriram, "Methodologies for bandwidth allocation, transmission scheduling, and congestion avoidance in broadband ATM networks", Computer Networks and ISDN Systems, 26 (1993) pp. 43-59.

V. P. Kumar, et al., "Beyond Best Effort: Router Architectures for the Differentiated Services of Tomorrow's Internet", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS in IP over ATM", Computer Communications, 22 (1999) pp. 411-418.

* cited by examiner

HTTP REDIRECTOR

BACKGROUND OF THE INVENTION

1. Related Applications

The present invention claims priority from U.S. Provisional Patent Application No. 60/197,490 entitled CONDUCTOR GATEWAY filed on Apr. 17, 2000.

2. Field of the Invention

The present invention relates, in general, to a system and method for managing user priority information, and, more particularly, to software, systems and methods for determining and updating user priority information using client stored information, a front-end, and a Hyper Text Transfer Protocol (HTTP) redirector server.

3. Relevant Background

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce (e-commerce), broadcast and multicast messaging, videoconferencing, gaming, and the like.

The Internet is a collection of heterogeneous computers and networks coupled together by a web of interconnections using standardized communications protocols. The Internet is characterized by its vast reach as a result of its wide and increasing availability and easy access protocols. Unfortunately, the ubiquitous nature of the Internet results in variable bandwidth and quality of service between points. The latency and reliability of data transport is largely determined by the total amount of traffic on the Internet and so varies wildly seasonally and throughout the day.

Internet protocols, routing mechanisms and address discovery mechanisms do not discriminate between users. Data packets are passed between routers and switches that make up the Internet based on the hardware's instantaneous view of the best path between source and destination nodes specified in the packet. Because each packet may take a different path, the latency of a packet cannot be guaranteed and in practice varies significantly. Likewise, data packets are routed through the Internet without any prioritization.

Prioritization has not been an issue with conventional networks such as local area networks (LANs) and wide area networks (WANs) because the average latency of such networks has been sufficiently low and sufficiently uniform to provide acceptable performance. However, there is an increasing demand for network applications that cannot tolerate high and variable latency. This situation is complicated when the application is to be run over the Internet where latency and variability in latency are many times greater than in LAN and WAN environments.

A particular need exists in environments that involve multiple users accessing a network resource such as a web server. Examples include broadcast, multicast and videoconferences as well as most electronic commerce applications. In these applications it is important to maintain a reliable connection so that the server and clients remain synchronized and information is not lost.

Although the ability to prioritize traffic and improve quality of service is recognized, the deployed Internet infrastructure does not implement mechanisms to provide such services. Moreover, the distributed nature of the Internet results in a slow upgrade process to implement new functionality. Literally thousands of entities that control various infrastructure components must agree on standards and cooperatively replace equipment and software in a process that takes years and sometimes decades. Hence, there is a need for systems and methods that enable communications to be captured and routed through proprietary systems that enable prioritization while still taking advantage of the deployed Internet infrastructure.

Existing DNS system is a single-destination architecture designed to direct a user request to a particular server on the Internet as specified by a uniform resource locator (URL) in the request. The DNS system will continue to direct requests to the server specified by the URL regardless of that site's availability, ability to respond to the request, or of quality of service to the specified site. The conventional DNS system is static and cannot adapt to dynamic network conditions. A need exists for a system and method of dynamically redirecting requests to locations that can efficiently service those requests.

Effective prioritization and quality of service management benefits significantly from flexible exchange of state information between various entities and machines managing a particular Internet connection. State information refers to information that associates individual data packets with users or machines and with prior network activity, assigned priority information, service class levels, and the like. However, the Internet is essentially designed as a stateless interconnect mechanism to make the network more robust when faced with network failures and inconsistencies. Hence, Internet protocols and standards do not support, and actually make it difficult to share state information useful in providing enhanced services such as prioritization and quality of service management.

By way of distinction, user-level or application-level processes can readily exchange state information because these processes have control over creating and managing data structures needed to exchange such information. However, these processes must be specially programmed in client and server software to enable such behavior. Moreover, the mechanisms implemented by these processes cannot be readily interpreted by standard Internet infrastructure components. Therefore, behaviors such as prioritization and quality of service management are propagated through, but not implemented within the Internet infrastructure.

Internet standards implement a limited mechanism for the exchange of state information specified in RFC 2109 entitled HTTP STATE MANAGEMENT MECHANISM published by the Internet engineering task force in 1997. This standard specifies two HTTP headers called "set-cookie" and "cookie" that indicate an HTTP packet having state information contained in the payload portion. Browser software that recognizes these headers is enabled to extract the state information and save it in a local data structure referred to as a "cookie". The standard requires that each cookie be saved with an indication of the domain for which the cookie is valid.

A client (e.g., browser software) only sends cookie information to servers having a domain matching the domain specified in the cookie. Standards also provide for subdomain cookies (e.g., a cookie set message sent by a subdomain server) that can be read by any server within the parent domain. By way of example, abc.xyz.com specifies a subdomain of xyz.com. A cookie can be set by abc.xyz.com that can be read by xyz.com, but cannot be read by, for example, xxx.com which is another domain. This architecture in combination with the single-destination nature of the DNS system prevents sharing of information in the form of cookies across domains.

SUMMARY OF THE INVENTION

Briefly stated, the present invention involves a system for exchanging domain-specific state information with a plurality of user agents. An intermediary computer has an interface for communicating with user agents over a network. The intermediary computer executes a first process running within a dynamically assigned domain and a second process running within a statically defined domain. The first process and second process are configured to communicate domain-specific state information associated with their own domains with the user agents. The first processes is also configured to communicate state information with each other via the user agent.

In operation, the interface receives a request from a user agent including domain-specific state information directed at the dynamically assigned domain. The first process converts the domain-specific state information into a parameter and passes the parameter back to the user agent with a redirection command instructing the user agent to generate a request to the statically defined domain. The user agent then generates a request to the second process including the parameter along with domain-specific state information associated with the statically defined domain.

The second process processes the parameter and the state information and passes the processed parameter back to the user agent together with domain-specific state information and a redirection command instructing the user agent to generate a request to the dynamically defined domain. The first process receives the request with the processed parameter, converts the processed parameter into domain-specific state information and returns the domain-specific state information to the user agent.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a is particular application. Accordingly, unless specified to the contrary, the present invention is applicable to significantly larger, more complex network environments as well as small network environments such as conventional LAN systems.

Figure 1:
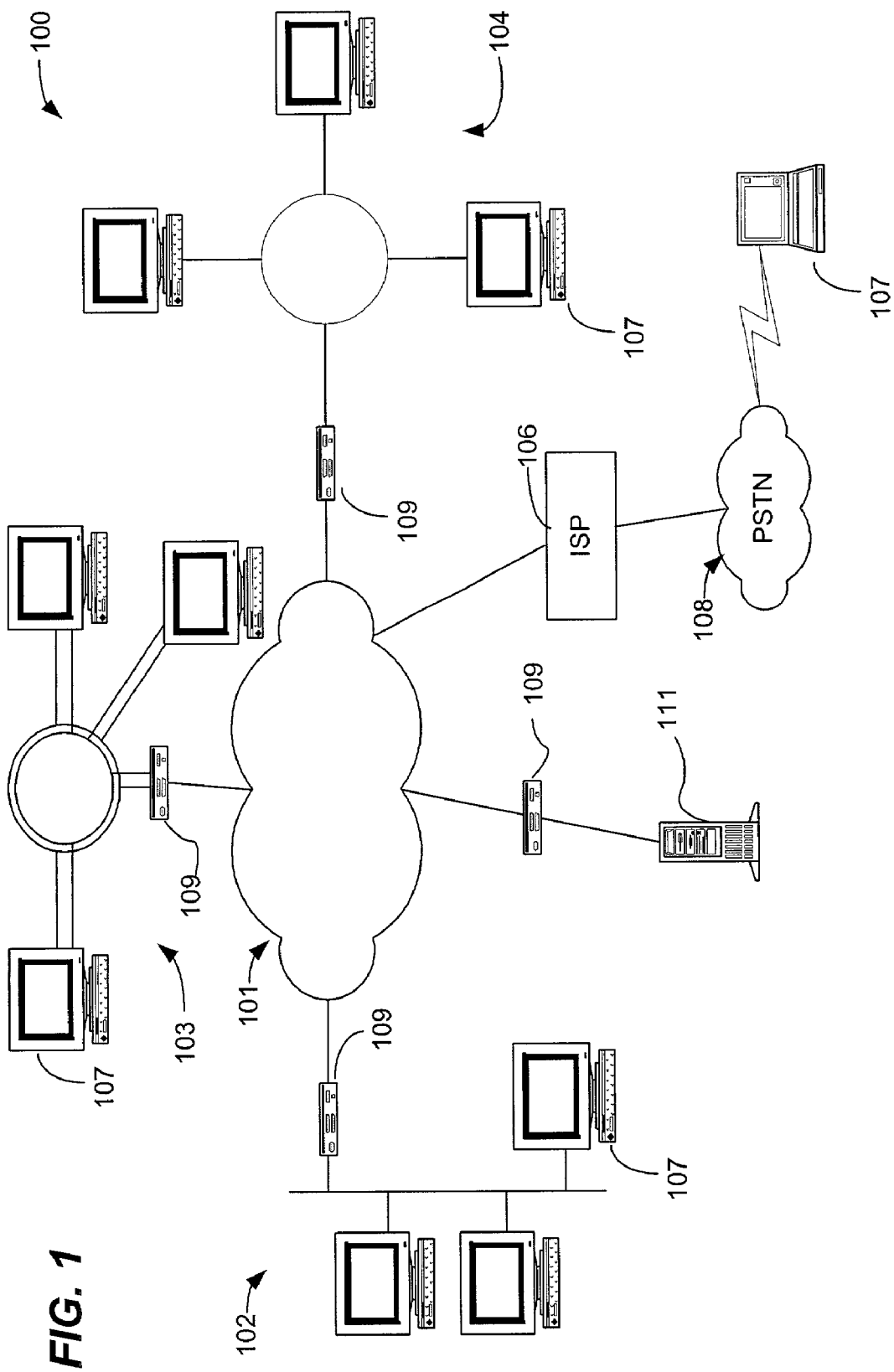
FIG. 1 illustrates a general distributed computing environment in which the present invention is implemented.

FIG. 1 shows an exemplary computing environment 100 in which the present invention may be implemented. Environment 100 includes a plurality of local networks such as Ethernet network 102, FDDI network 103 and Token ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fiber channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Micrsosoft Windows, MacIntosh OS, and the like. At the same time, some appliances 107 comprise portable or handheld devices using wireless connections through a wireless access provider (WAP) such as personal digital assistants and cell phones executing operating system software such as PalmOS, WindowsCE, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

The present invention operates in a manner akin to a private network 200 implemented within the Internet infrastructure. Private network 200 expedites and prioritizes communications between a client 205 and a web site 210. In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications for file transfer protocol (FTP) services, voice over Internet protocol (VOIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via wireless application protocol (WAP) or the like.

For convenience, the term "web site" is used interchangeably with "web server" in the description herein, although it should be understood that a web site comprises a collection of content, programs and processes implemented on one or more web servers. A web site is owned by the content provider such as an e-commerce vendor, whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end 201 and back-end 203. Front-end 201 and back-end 203 are coupled by a managed data communication link 202 that forms, in essence, a private network.

Front-end mechanism 201 serves as an access point for client-side communications. In the process of translating a requested domain name into an IP address of a particular server hosting the requested domain name, mechanisms described in reference to FIG. 3 operate to select a particular front-end mechanism 201. In effect, the domain is dynamically assigned to the selected front-end mechanism. More than one front-end 201 may host a single domain. Also, any particular front-end 201 may host multiple dynamically assigned domains. So long as a client 205 associates the domain name with the IP address of the selected front-end 201, all client requests to the domain will be routed to the selected front-end 201.

Front-end mechanism 201 implements a set of processes in the dynamically assigned domain that implements a gateway for origin servers implementing web site 210 (i.e., from the perspective of client 205, front-end 201 appears to be the web site 210). Unlike conventional proxy servers, however, client 205 need not be aware that it is connected to a front-end 201.

State management functions are implemented by a state management server 206. State management server 206 may be implemented as a separate network-coupled server or is preferably implemented as a process executing on front-end 201 (indicated by an "S" in FIG. 2). In either case, the state management server 206 is assigned to and executes within a statically defined domain (e.g., "stateserver.com". This statically defined domain may be explicit (i.e., registered with the public domain name system) or implicit (i.e., reachable only by reference to a numeric IP address of the physical machine in which the state management server is implemented). The present invention involves mechanisms and methods enabling exchange of domain-specific state information between front-ends 201, state management server(s) 206, and user agents 205.

Front-end 201 comprises, for example, a computer that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in point of presence (POP) of an Internet service provider (ISP) 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

Transport mechanism 202 is implemented by cooperative actions of the front-end 201 and back-end 203. Back-end 203 processes and directs data communication to and from web site 210. Transport mechanism 202 communicates data packets using a proprietary protocol over the public Internet infrastructure in the particular example. Hence, the present invention does not require heavy infrastructure investments and automatically benefits from improvements implemented in the general purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can by dynamically changed, a fixed hardware infrastructure can be logically reconfigured to map more or fewer front-ends to more or fewer back-ends and web sites or servers as needed.

Front-end 201 together with back-end 203 function to reduce traffic across the TMP link 202 and to improve response time for selected browsers. Traffic across the TMP link 202 is reduced by compressing data and serving browser requests from cache for fast retrieval. Also, the blending of request datagrams results in fewer request: acknowledge pairs across the TMP link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. Response time is further improved for select privileged users and for specially marked resources by determining the priority for each HTTP transmission.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the TMP link 202 thereby yielding control over more of the transport path to the management mechanisms of the present invention.

Clients 205 no longer conduct all data transactions directly with the web server 210. Instead, clients 205 conduct some and preferably a majority of transactions with front-ends 201, which simulate the functions of web server 210. Client data is then sent, using TMP link 202, to the back-end 203 and then to the web server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end 201 and back-end 203 can be permanently maintained, shortening the many TCP/IP connection sequences normally required for many clients connecting and disconnecting.

Using a proprietary protocol allows the use of more effective techniques to improve data throughput and makes better use of existing bandwidth during periods when the network is congested.

Figure 2:
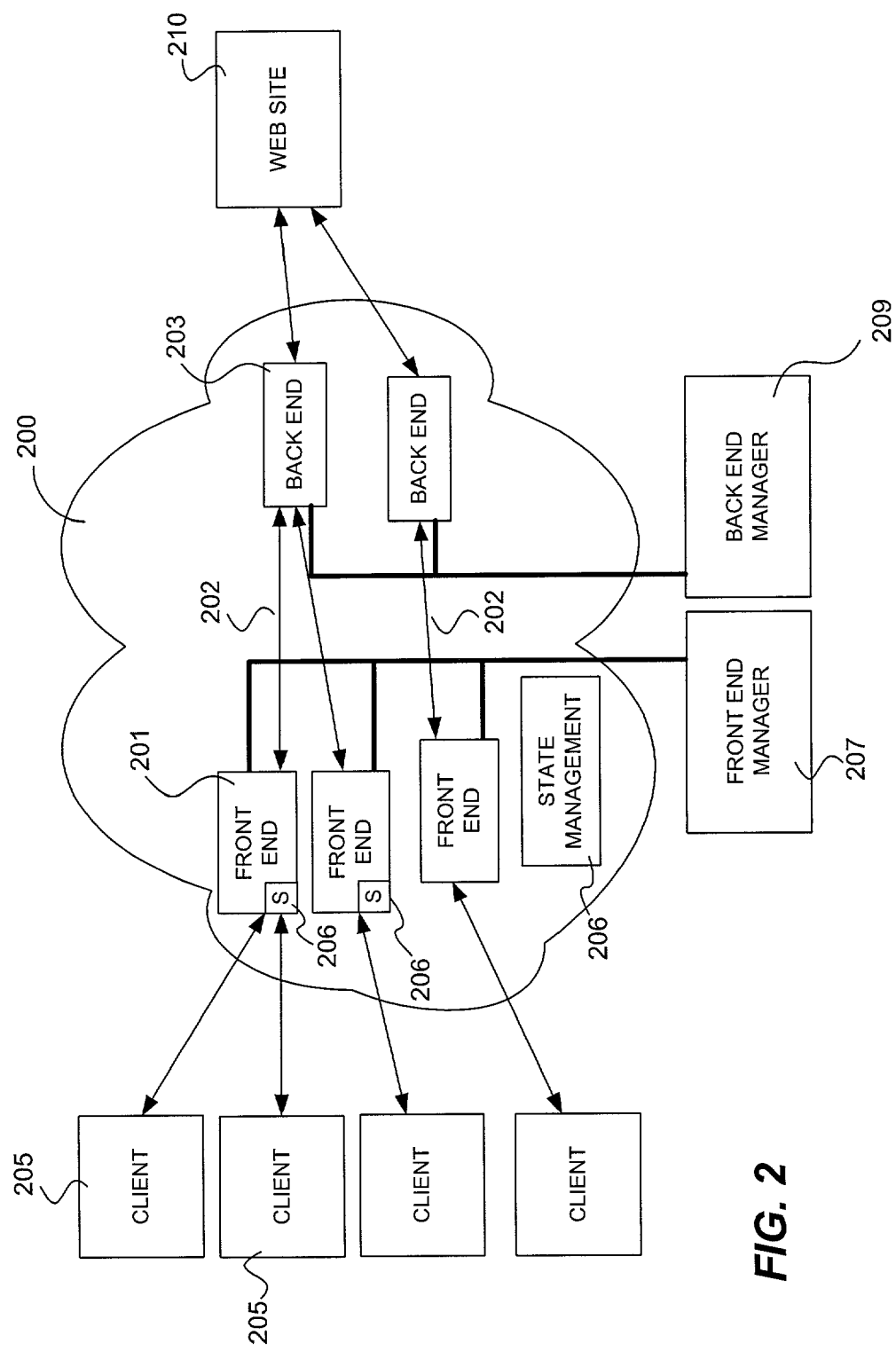
FIG. 2 shows in block-diagram form significant components of a system in accordance with the present invention.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples front-end manager 207 and back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by TMP 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

In order for a client 205 to obtain service from a front-end 201, it must first be directed to a front-end 201 that can provide the desired service. Preferably, client 205 does not need to be aware of the location of front-end 201, and initiates all transactions as if it were contacting the originating server 210. In essence, this involves dynamically assigning a particular front-end 201 to a domain specified by a current client request. To avoid requirements for special client software to be installed, this dynamic domain assignment must work cooperatively with the public domain name system.

Figure 3:
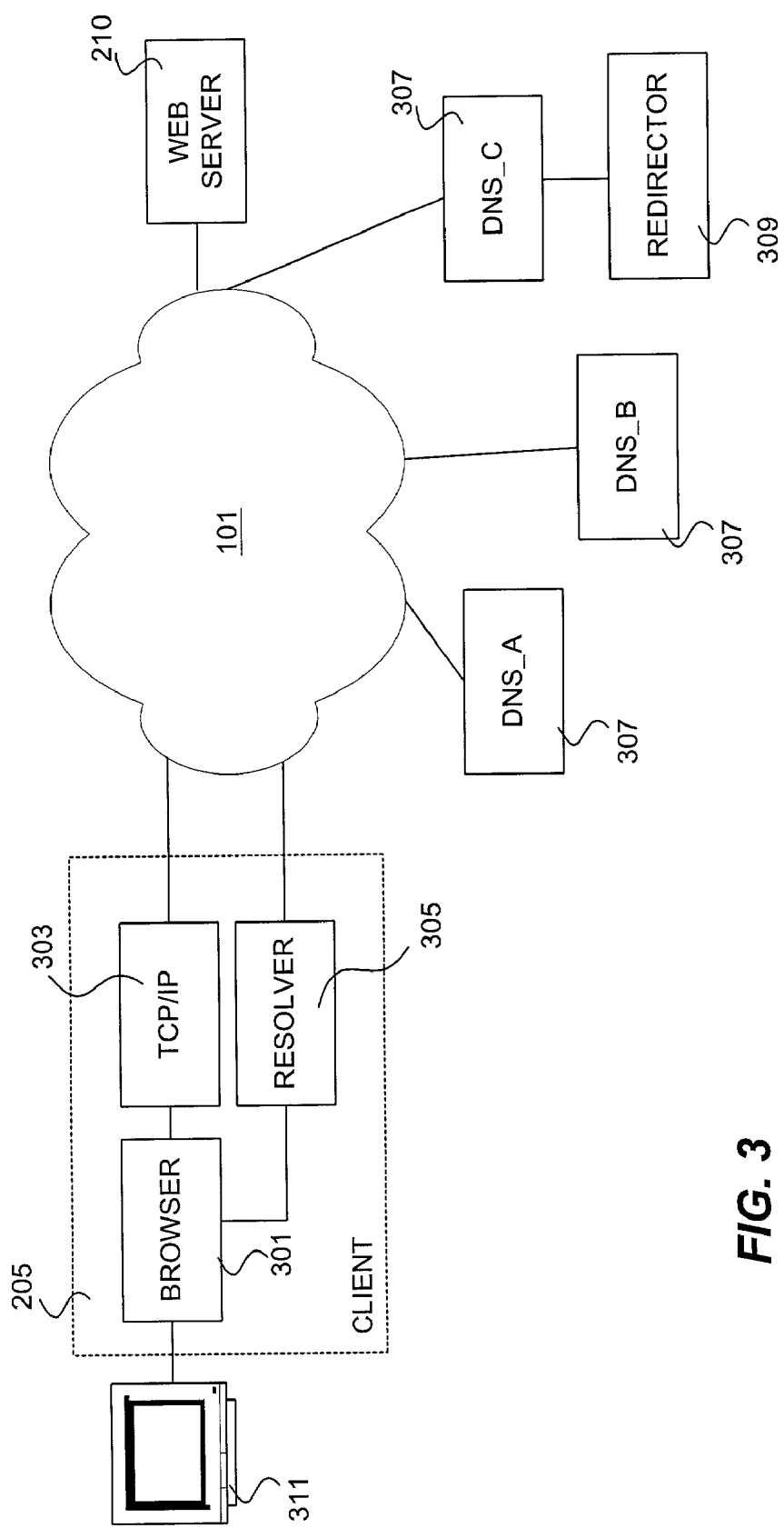
FIG. 3 shows a domain name system used in an implementation of the present invention.

FIG. 3 illustrates a domain name server (DNS) redirection mechanism that illustrates how a client 205 is connected to a front-end 201. The DNS system is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. For example, the domain "www.uspto.gov" is, at the time of this application, associated with a server located at the numeric IP address "63.71.228.6". These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.uspto.gov), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to a specific front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 may identify a currently assigned back-end 203 by direct or indirect reference to DNS_C. In other words, a particular front-end 201 is dynamically assigned to the domain "circadence.com" on a request-by-request basis.

State management server 206 (shown in FIG. 2) may or may not use the DNS system shown in FIG. 3. State management server 206 may have an implicit network address that is only reached by specification of a numeric IP address assigned to that server. Alternatively, state management server, when implemented as a shared network connected server at a known IP address, may be registered with the public DNS so that requests for "stateserver.com" resolve to that address. In yet another alternative, "stateserver.com" may be configured as a domain that refers to redirector 309 to be resolved to either a central state server 206 or a state server 206 implemented within a particular front-end 201.

Figure 4:
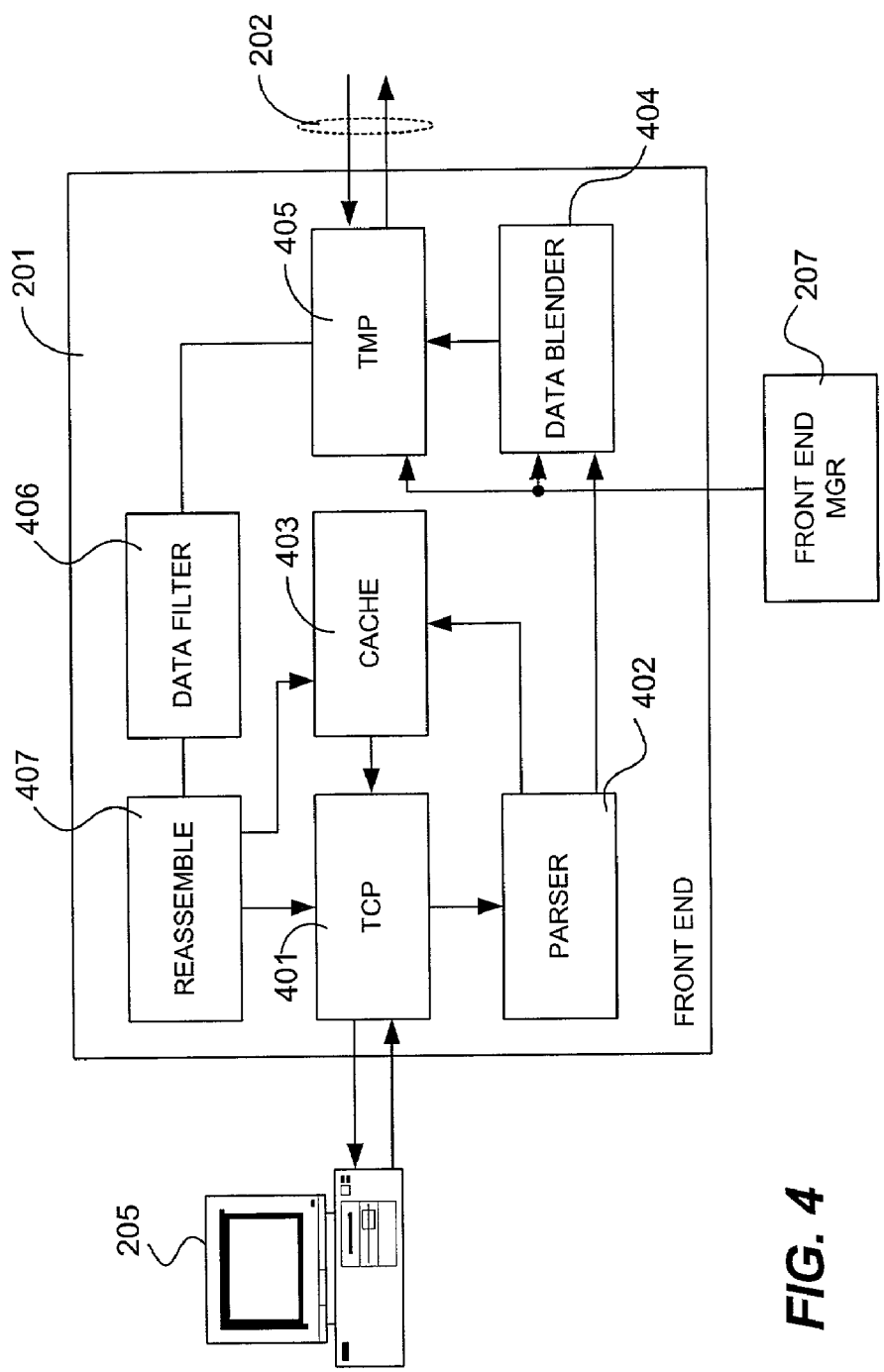
FIG. 4 shows front-end components of FIG. 2 in greater detail.

FIG. 4 illustrates principle functional components of an exemplary front-end 201 in greater detail. Primary functions of the front-end 201 include translating transmission control protocol (TCP) packets from client 205 into transport morphing protocol™ (TMP™) packets used in the system in accordance with the present invention. Transport morphing protocol and TMP are trademarks or registered trademarks of Circadence Corporation in the United States and other countries. It is contemplated that the various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1. The present invention is readily adapted to any application where multiple clients are coupling to a centralized resource. Moreover, other transport protocols may be used, including proprietary transport protocols.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use, the advantage that currently available browser software is able to readily use the HTTP protocol, and that HTTP includes rudimentary mechanisms for exchanging state information in the form of "cookies" with user agents 205. In this case, parser 402 comprises an HTTP parser. More generally, parser 402 can be implemented as any parser-type logic implemented in hardware or software for interpreting the contents of the payload portion. Parser 402 may implement a file transfer protocol (FTP), mail protocols such as simple mail transport protocol (SMTP), structured query language (SQL) and the like. Any user-level protocol, including proprietary protocols, may be implemented within the present invention using appropriate modification of parser 402.

HTTP parser 402 extracts cookie information from received requests. HTTP cookies are domain-specific in that a user agent 205 will only send cookie information to a server within a domain associated with the cookie. Because HTTP front-end 201 is operating in the dynamically assigned domain of a web site 210, it will receive the domain-specific cookie(s) associated with that domain if they exist. A domain-specific cookie includes state information used by web site 210, but in accordance with the present invention also includes information used by front-end 201 to provide enhanced services such as prioritization of data transport, alternative content, quality of service management and the like.

The information used by front-end 201 is preferably removed from the domain-specific cookie before it is passed on to a server 210. For this reason, the terms "domain-specific cookie" and "domain cookie" refer to the cookie or portion of a cookie that contain state information used by the front-end 201, but it should be understood that other information intended for a web site 210 may also be included.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

Optionally, front-end 201 implements security processes, compression processes, encryption processes and the like to condition the received data for improved transport performance and/or provide additional functionality. These processes may be implemented within any of the functional components (e.g., data blender 404) or implemented as separate functional components within front-end 201. Also, parser 402 may implement a prioritization program to identify packets that should be given higher priority service. A prioritization program requires only that parser 402 include a data structure associating particular clients 205 or particular TCP packet types or contents with a prioritization value. Based on the prioritization value, parser 402 may selectively implement such features as caching, encryption, security, compression and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP units" that are sized for transport through the TMP mechanism 202. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 207 that enables selection of a preferable TMP packet size. Alternatively, a fixed TMP packet size can be set that yields desirable performance across TMP mechanism 202. Data blender 404 also marks the TMP units so that they can be re-assembled at the receiving end.

Data blender 404 also serves as a buffer for storing packets from all clients 205 that are associated with front-end 201. Blender 404 mixes data packets coming into front-end 201 into a cohesive stream of TMP packets sent to back-end 203 over TMP link 202. In creating a TMP packet, blender 404 is able to pick and choose amongst the available data packets so as to prioritize some data packets over others. One use of the domain cookie is to use the state information within the domain cookie as a basis for prioritization in blender 404.

Figure 5:
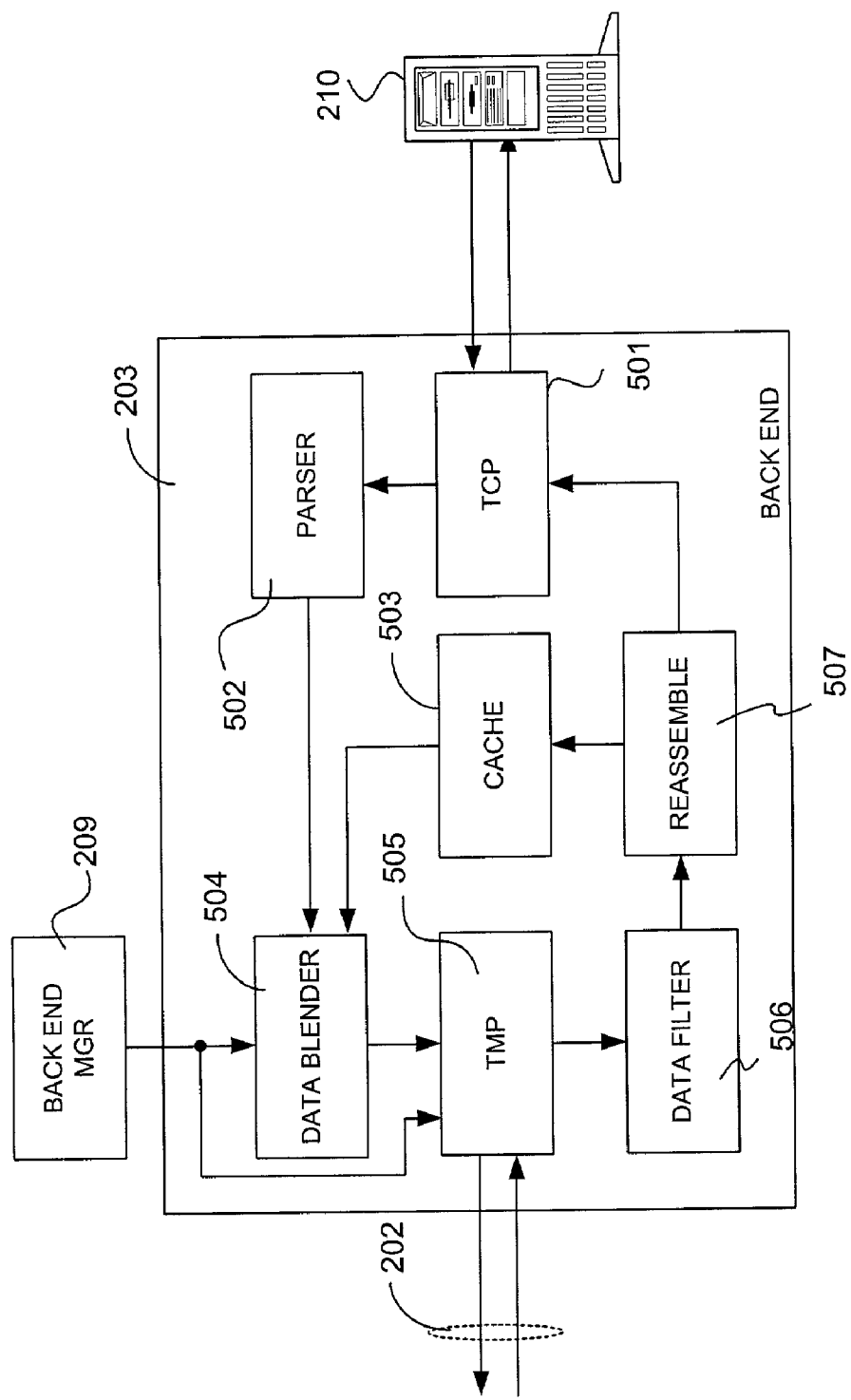
FIG. 5 shows back-end components of FIG. 2 in greater detail.

TMP mechanism 405 implements the TMP protocol in accordance with the present invention. TMP is a TCP-like protocol adapted to improve performance for multiple channels operating over a single connection. Front-end TMP mechanism 405 and a corresponding back-end TMP mechanism 505 shown in FIG. 5 are computer processes that implement the end points of TMP link 202. The TMP mechanism in accordance with the present invention creates and maintains a stable connection between two processes for high-speed, reliable, adaptable communication.

Another feature of TMP is its ability to channel numerous TCP connections through a single TMP pipe 202. The environment in which TMP resides allows multiple TCP connections to occur at one end of the system. These TCP connections are then mapped into a single TMP connection. The TMP connection is then broken down at the other end of the TMP pipe 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a TMP pipe 202. As often happens in a network environment, each end has a great deal of information about the characteristics of the connection in one direction, but not the other. By knowing about the connection as a whole, TMP can better take advantage of the available bandwidth.

Also shown in FIG. 4 are data filter component 406 and HTTP reassemble component 407 that process incoming (with respect to client 205) data. TMP mechanism 405 receives TMP packets from TMP pipe 202 and extracts the TMP data units. Using the appended sequencing information, the extracted data units are reassembled into HTTP data packet information by HTTP reassembler 407. Data filter component 406 may also implement data decompression where appropriate, decryption, and handle caching when the returning data is of a cacheable type.

FIG. 5 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210.

TMP unit 505 receives TMP packets from TMP pipe 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 4 to extract the data portion from the received TCP packets, perform optional compression, encryption and the like, and forward those packets to data blender 504. Data blender 504 operates in a manner akin to data blender 404 shown in FIG. 3 to buffer and prioritize packets in a manner that is efficient for TMP transfer. Priority information is received by, for example, back-end manager 209 based upon criteria established by the web site owner. TMP data is streamed into TMP unit 505 for communication on TMP pipe 202.

Figure 6:
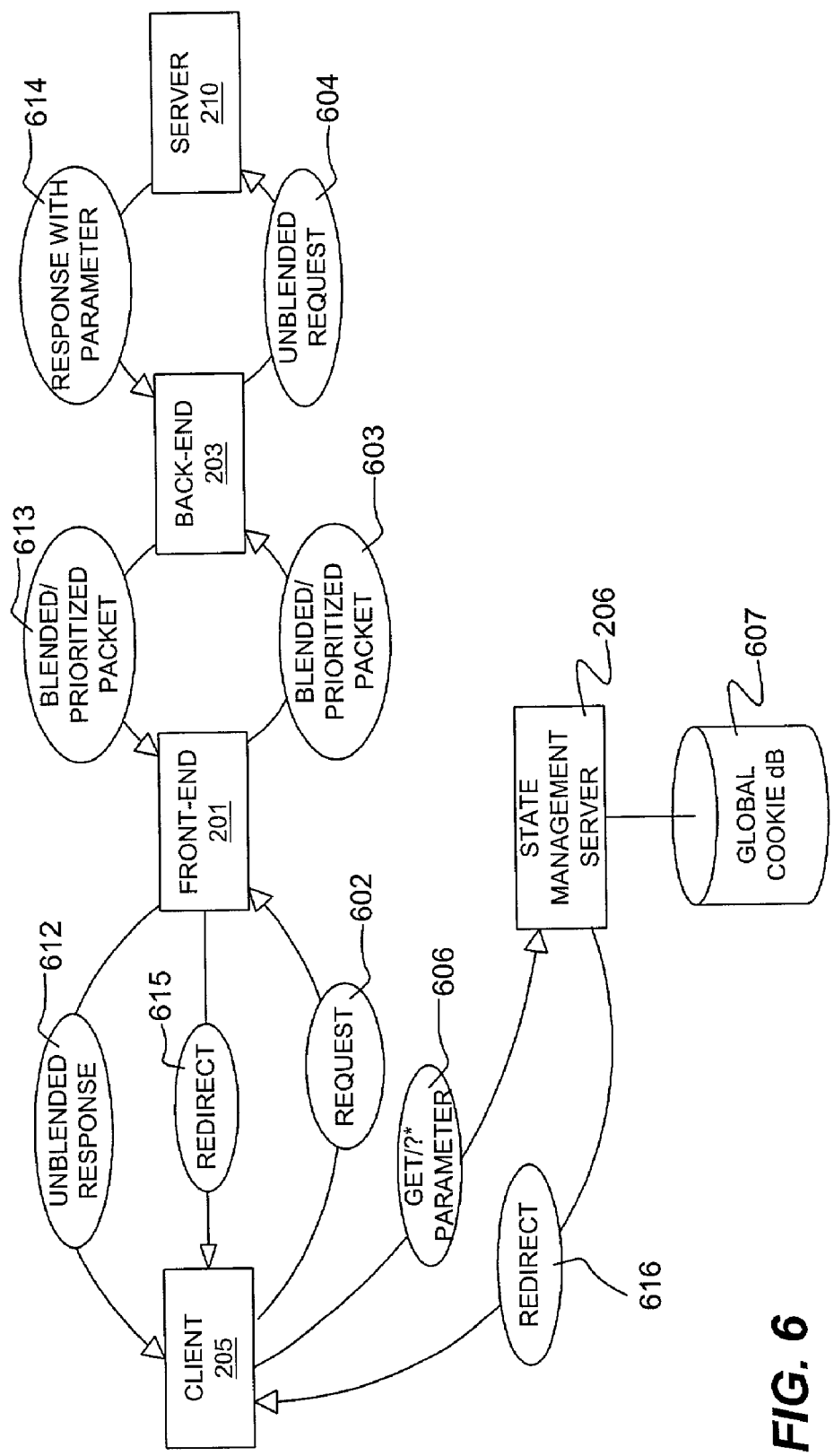
FIG. 6 depicts a set of network devices that participate in a logical session in accordance with the present invention.

FIG. 6 depicts a set of network devices that participate in a logical session in accordance with the present invention. Front-end 201 receives HTTP requests directed at the domain in which front-end 201 is dynamically assigned. Front-end 201 checks for the presence of cookies in the HTTP request, and in particular checks for the presence of a "domain cookie" that includes the domain user priority information. When a domain cookie is present, the request includes:

GET index.html?1234 HTTP/1.1
Host:www.a.com
Cookies: Id: CrcdncCGW Data: CookieDataCRC where the name of the domain cookie is "CrcdncCGW Data" and the value is "CookieDataCRC", although these designations are a simple matter of nomenclature. The cookie value contains the following information in a particular example:

| Field | V.1 offset/size | Legal Values |
| --- | --- | --- |
| Version Number | 0/1 | 0 = debug version |
| | | 1 = initial release |
| User Priority | 1/1 | 0–4 |
| Priority Update Interval | 2/1 | 7–12 |
| Hits This Interval | 3/2 | 0–4096 |
| Credits This Interval | 5/3 | any |
| Checksum | 13/4 | 0 |
| Salt | any | any |

In actuality, a domain cookie might look like "1plhhCCCgl6fG" as the cookie information is transmitted in an encoded form. The version offset/size indicates the number of bits used to convey the specified field of information and does not need to be explicitly transmitted as it is implicitly conveyed in the "version number" information. The version number specifies the format of the cookie to allow for future updates by increasing or decreasing the size of particular fields, and providing for the addition or deletion of fields included in the cookie information. The user priority field conveys the DSUP value. The priority update field indicates the effective expiration of the domain cookie by indicating a number of hits before this domain's priority requires updating (e.g., by redirection to state management server 206). The "hits this interval" field indicates a number of hits recorded in this domain (i.e., www.a.com) during this interval where an interval refers to the time since the domain cookie was last updated by redirection state management server 206. Credits this interval indicates the number of page credits recorded in this domain during this interval.

Preferably a checksum field is also included to ensure the cookie data has not been corrupted or tampered with. Because the cookie data is encrypted, any change to the encrypted cookie will alter the checksum bits. When the checksum is not correct, front-end 201 will assume that the cookie has become corrupted and will get a new cookie from state management server 206 in a manner similar to when a domain cookie does not exist. Front-end 201 preferably does not pass domain cookies to server 210. The domain cookie information is stored in front-end 201 to be used when a response is sent to client 205.

Front-end 201 reads parameters being passed in the request 602, including a Host: parameter that identifies the host machine corresponding to server 210. As described below, the GET request includes additional parameters when there has been a redirection to/from state management server 206.

One parameter that is included in a particular example is called a "link code". A back-end 203 writes link codes into all of the web pages that it returns to a client 205 (via a front-end 201). Hence, whenever a user of client 205 follows a hypertext link that points to another page or resource within a domain, the link code can be included in the request. In the particular examples, the link code includes a field to identify the server 210 associated with the link code. Also, the front-end 201 may insert a link code as a parameter in redirect message 615 which is then passed as a parameter to state management server 206 in message 606, and passed back to client 205 in redirect message 616. Using link codes, it is not necessary to include an additional parameter to identify the host name of server 210 because that information is already included in the link code. Like domain cookies, the link code is preferably stripped from the request before it is passed to server 210.

After receiving the HTTP request, front-end 201 checks cache 403 to see if the requested content is available locally. When the content is not available or is older than specified caching parameters, the request is passed to back-end 203 without the domain cookie or link code parameters in a blended packet 803. The blended packet 603 comprises multiple request packets from multiple clients 205. The actual composition of any particular blended packet 603 is determined by the relative priority values associated with each particular request packet 802.

Back-end 203 receives blended packet 603, un-blends it, and forwards each request within the blended packet 603 as an unblended request packet 604 to the corresponding server 210. Any cookies that the site "www.a.com" expects will be included in the HTTP request from back-end 203. From the perspective of each server 210, a conventional HTTP request packet is received and a response 614 is generated including the requested content and/or services. Response 614 may also include priority information (e.g., content priority and/or site-specific user priority) in the form of parameters. Back-end 203 extracts the parameter information from response 614. Back-end 203 also examines each embedded link within response 814 and modifies each link as necessary to ensure that the link is relative to the web site root (if not already) so that redirector 309 does not need to be consulted when the links are followed by a client 205. The links are also modified as necessary to include a link code indicating content priority of the content pointed to by the link.

Back-end 203 maintains a map of the web site and/or services provided by server 210 and content priority associated with each resource within the web site and/or service. Back-end 203 uses this information to associate a content priority with each response 614 in the particular example. Optionally, any given response 614 may also include a parameter indicating a site-specific user priority value (SSUP). In a particular example, the SSUP is encoded as a command in the HTML header of an HTML document being transmitted by response 614 in the form: <!CrcdncPri=x> where "x" is a number between 0 and 4. The SSUP provides a means by which the server 210 can, but is not required to, insert tags, recognizable by back-end 203 into response 614.

Back-end 203 computes an effective priority for each response 614 based upon the content priority, SSUP, and/or the domain-specific user priority included in the link code, if any, transmitted with the request 802. The algorithm and weighting applied by back-end 203 is independent of the priority and weighting algorithm applied by back-end 201. As a result, the effective priority of a response packet 614 may be different from the effective priority applied to the corresponding request packet 602.

The modified responses 614 are blended according to a computed effective priority value and transmitted in a blended packet 613. Blended packet 613 may comprise multiple response packets 614 in a proportion determined by a weighting algorithm implemented within back-end 203. Where front-end 201 transmits user-identification information to back-end 203, the weighting algorithm may account for DSUP and SSUP in addition to content priority provided by server 210.

Optionally, a cache mechanism (not shown) may be included within back-end 203 to selectively cache content, preferably after link modification described above. When content is cached, back-end 203 may deliver content from the cache rather than generating a request to server 210.

Front-end 201 receives the blended packet 613 and generates an unblended response packet 612 for each response 614 contained therein. Where content is indicated as cacheable, front-end 201 places a copy of the content in its cache as described hereinbefore. From the perspective of client 205, the response 614 appears to have come directly from server 210. Response 614 includes SET cookie information required to update the domain cookie to reflect the new DSUP value, including page credits resulting from the current request.

When a domain cookie is not present, i.e. this client 205 has not visited this domain previously, then the client 205 is redirected to a common domain (e.g. "stateserver.com"), which is running an state management process 206. Likewise, when the domain cookie has expired, redirection to state management server 206 is performed. The state management server 206, in practice, may be implemented on the same physical machine as front-end 201. Also, in the preferred implementations, each domain cookie has a defined expiration after which it mush "check in" with the state management 206. The expiration may be measured in terms of time (e.g., every 7 days), usage (e.g., every 1000 times the domain cookie is received by a front-end 201) or other available criteria, including random expiration criteria.

To redirect a client 205 to state management server 206, client 205 is sent an HTTP Redirect response 615. The redirect response 615 may comprise a redirection to an explicit server or implicit server. The present invention is described in terms of HTTP servers because HTTP supports redirection, although other protocols that support redirection may be implemented in a similar manner. An explicit redirection takes the form:

Redirect:stateserver.com/index.html?1234?*LinkCdCRC-*00000000000*www.a.com HTTP/1.1).

where the original domain, "www.a.com" is sent as a parameter in the URL. An explicit redirection causes client 205 to perform a DNS lookup on "stateserver.com" and then send state management server 206 an HTTP GET request. When HTTP Redirector is run as a separate process on front-end 201 the DNS lookup will give the same numerical IP address as returned for the lookup of "www.a.com", and so the DNS system described in FIG. 3 must return the IP address of the front-end 201 within the dynamically assigned domain. Such an implementation may require that DNS redirector 309 maintain information the dynamic mapping of particular user agents to particular front-ends 201.

An implicit redirection takes the form:
Redirect:Host:stateserver.com:206.257.46.57/index.html?-1234?*LinkCdCRC*00000000000*www.a.com HTTP/1.1).

where "206.257.46.57" is the IP address of the machine implementing state management server 206. When state management server 206 is implemented within a front-end 201, "206.257.46.57" is the address of front-end 201 as well.

The user agent receives the redirect response 615, resolves the location of state management server 206 if necessary, and sends a request 606 to the state management server 206. The domain-specific cookie data from the original request is also passed as a parameter in the redirect response 615 and request 606. To indicate that no domain cookie is available, a zeroed cookie is sent.

State management server is in a different domain from the dynamically assigned domain. Accordingly, the redirected request 606 will contain state information in the form of cookies intended for the statically defined domain assigned to state management server 206 (e.g., stateserver.com"). This allows state management server 206 to read and write a global cookie associated with the stateserver.com domain. Hence, request 606 actually includes state information associated with multiple domains, e.g., the dynamically assigned domain and the statically assigned domain. Alternatively, state management server may maintain a global cookie database 607 as needed.

State management server 206 will receive a request in the form:

GET
   index.html?1234?*LinkCdCRC*00000000000-
      *www.a.com HTTP/1.1
Host: gateway.circadence.com
Cookies: Id: Stateserver Data: GlobalCookCRC State management server 206 reads the domain cookie parameter and computes a global priority value based upon the DSUP sent in the domain cookie parameter and a global user priority read from the global cookie. It should be understood that the global cookie will be sent irrespective of which dynamically assigned domain initiated the redirection. Hence, the state management server 206 is in possession of cross-domain state information. In a particular example, the global user priority is updated to combine the information in the global cookie with the domain-specific information sent in the domain cookie parameter, to determine an updated global cookie value. When no domain cookie is available as indicated by a zeroed cookie received in the GET request, state management sever 206 will create a domain cookie based upon a default value.

State management server 206 sends an HTTP redirection response to client 205, sending client 205 back to front-end 201 and the dynamically assigned domain. When a new domain cookie is created, it is passed to client 205 in the redirect response 616 in the form:

Redirect:www.a.com/set
cookie:
   GlobalCookCRC?1234?*LinkCdCRC*CookieDataCRC
   HTTP/1.1.

The set cookie command causes the user agent to store the global cookie in its cookie files. The parameter returned contains domain-specific cookie data for front-end 201. The return address "www.a.com" is derived from the parameter information sent in the redirected request 606. Upon receipt of redirect response 616, user agent 205 generates another request 602 containing the domain-specific cookie as a parameter.

Front-end 201 stores the updated cookie and writes it to client 205 when it sends response message 612. Client 205 will store the domain-specific cookie. The domain-specific cookie, and therefore the user data, will be available directly the next time client 205 connects to this customer domain (e.g., www.a.com) using any front end 201, not just the front-end 201 used when the cookie was created/modified.

Figure 7:
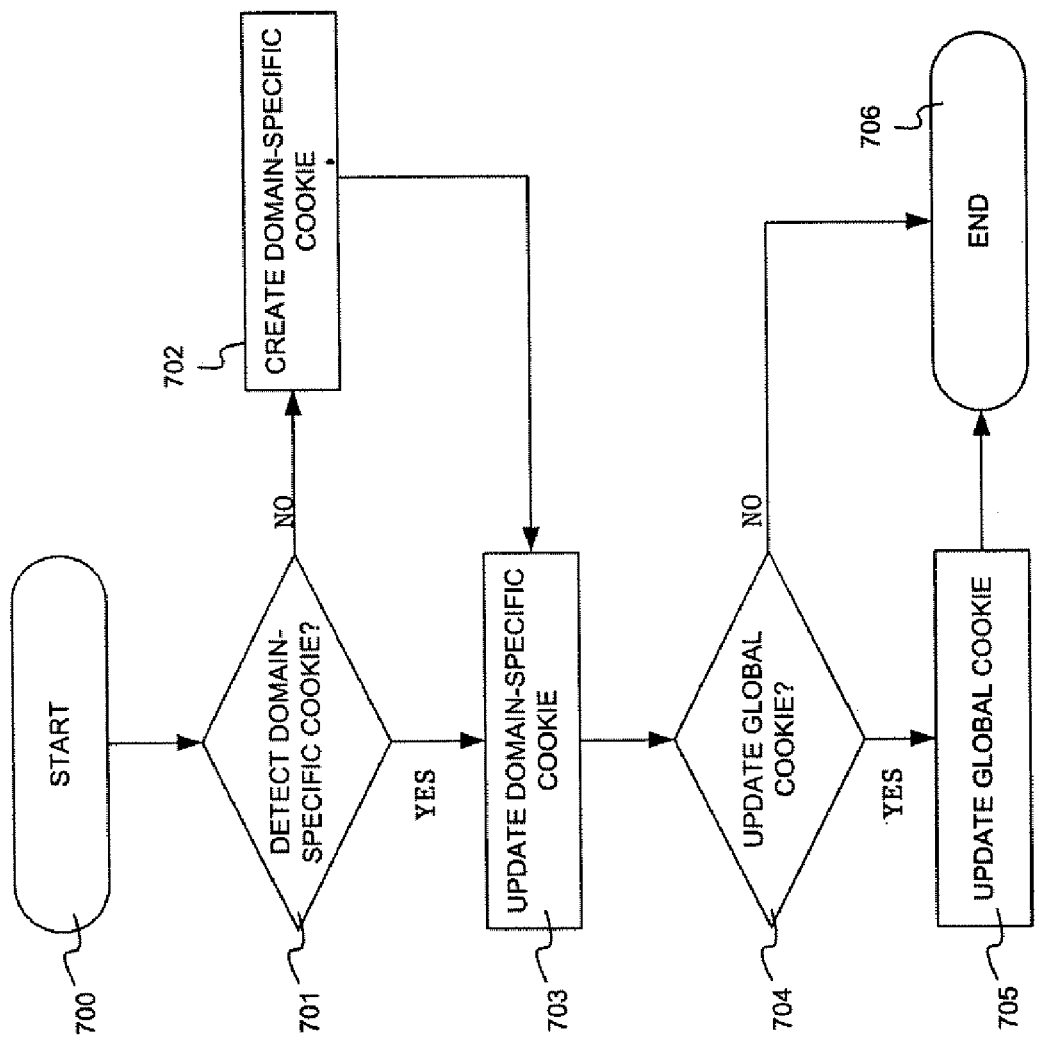
FIG. 7 shows a high-level flow chart representing a session in accordance with the present invention.

FIGS. 7 through 10 illustrate state information management and exchange processes in accordance with the present invention. In FIG. 7, at step 700, a state information process in accordance with the present invention is initiated. In one embodiment, the state information management session is initiated when front-end 201 receives a request from user agent 205 for content from origin server 210.

At step 701, front-end 201 determines whether a domain-specific cookie is present. Specifically, front-end 201 reviews the HTTP packet header to determine whether it contains a domain-specific cookie. The domain-specific cookie may or may not contain information intended for a front-end 201, depending on whether the request comes from user agent 205 that has used a front-end 201 in the past. Moreover, the domain-specific cookie may exist if the user agent 205 has not visited this domain before. When the domain-specific cookie includes information intended for both front-end 201 and server 210, it is desirable to include a definitive marker between these data sets to prevent the origin server from overwriting the domain-specific cookie and to prevent the domain-specific cookie from overwriting a cookie created by the origin server.

When the front-end determines that there is domain-specific cookie containing information intended for front-end 201, the process proceeds to step 702. At step 702, the processes to create a domain-specific cookie are performed. This function refers to state management server 206 to obtain either default information or, preferably, state information based upon interactions between the user agent 205 and other domains. In a particular application, this state information reflects a user-based priority value based on the historic content of requests made by user agent 205 from one or more origin servers outside the domain of origin server 210.

Upon completion of function 702, the process proceeds to step 703. When the front-end 201 determines that there is a front-end cookie, the system proceeds from step 701 to step 703. At step 703, a domain-specific cookie update function is performed. In a preferred embodiment, this function maintains priority information regarding content requested by user agent 205, and updates the value of the domain-specific cookie data to reflect the requested content. Step 703 is described in greater detail in relation to FIG. 9.

At step 704, it is determined whether the global cookie value should be updated. The global cookie contains cross-domain state information. Accordingly, the domain-specific state information must occasionally "check-in" so that the global cookie will reflect actual user activity. Theoretically, the global cookie can be updated each and every time the domain-specific state information is changed. However, such an update policy would result in frequent minor updates. Preferably, global cookie updates are implemented at intervals selected to balance the need for accurate and current global state information against the resource commitment and data traffic required to perform the update functions. In a particular implementation, step 704 is implemented by defining a predetermined condition that when satisfied causes an update to occur.

In a preferred embodiment, the predetermined condition is whether a predetermined number of requests have been made by user agent 205 to the current dynamically assigned domain. For example, for a particular domain the update frequency may be set to update the global cookie every 1024 requests to that domain. This predetermined number of requests is referred to as a hit interval. The hit interval for a particular domain is preferably stored in the domain-specific cookie as set out hereinbefore. The hit interval may be the same for all domains, the same for a category of domains, established for each domain, or determined by other criteria.

In one embodiment, a request is defined as an explicit request provided by user agent 205 under the control of a user. For example, if a user types in www.abc.com/page1.html, user agent 205 may initiate a plurality of requests for items contained within the explicitly requested resource, such as banner ads and multimedia files. The request for www.abc.com/page1.html counts as one request for the purpose of step 704. Accordingly, the "credits this interval" field of the domain cookie is incremented one time irrespective of the fact that multiple implicit HTTP request were generated by the explicit request. Step 704 is preferably implemented at front-end 201. When the predetermined condition has not been satisfied, the system proceeds to step 706. When the predetermined condition has been satisfied, the system proceeds to step 705.

At step 705, the global cookie update function is performed. In a preferred embodiment, the global cookie update function involves a redirection from front-end 201 to state management server 206, wherein the redirection additionally comprises appended parameter data. The parameter data provides state management server 206 with the domain-specific state information determined by front-end 201 during step 703. In step 705, updated global state information is determined, the domain-specific state information is updated, and the new domain-specific state information is returned to front-end 201. Update processes 705 may also include processes to update the state information, in the form of the global cookie and the domain-specific cookie, stored within a user agent 205. At the conclusion of step 705, the system proceeds to step 706 and the state information management processes are terminated.

Figure 8:
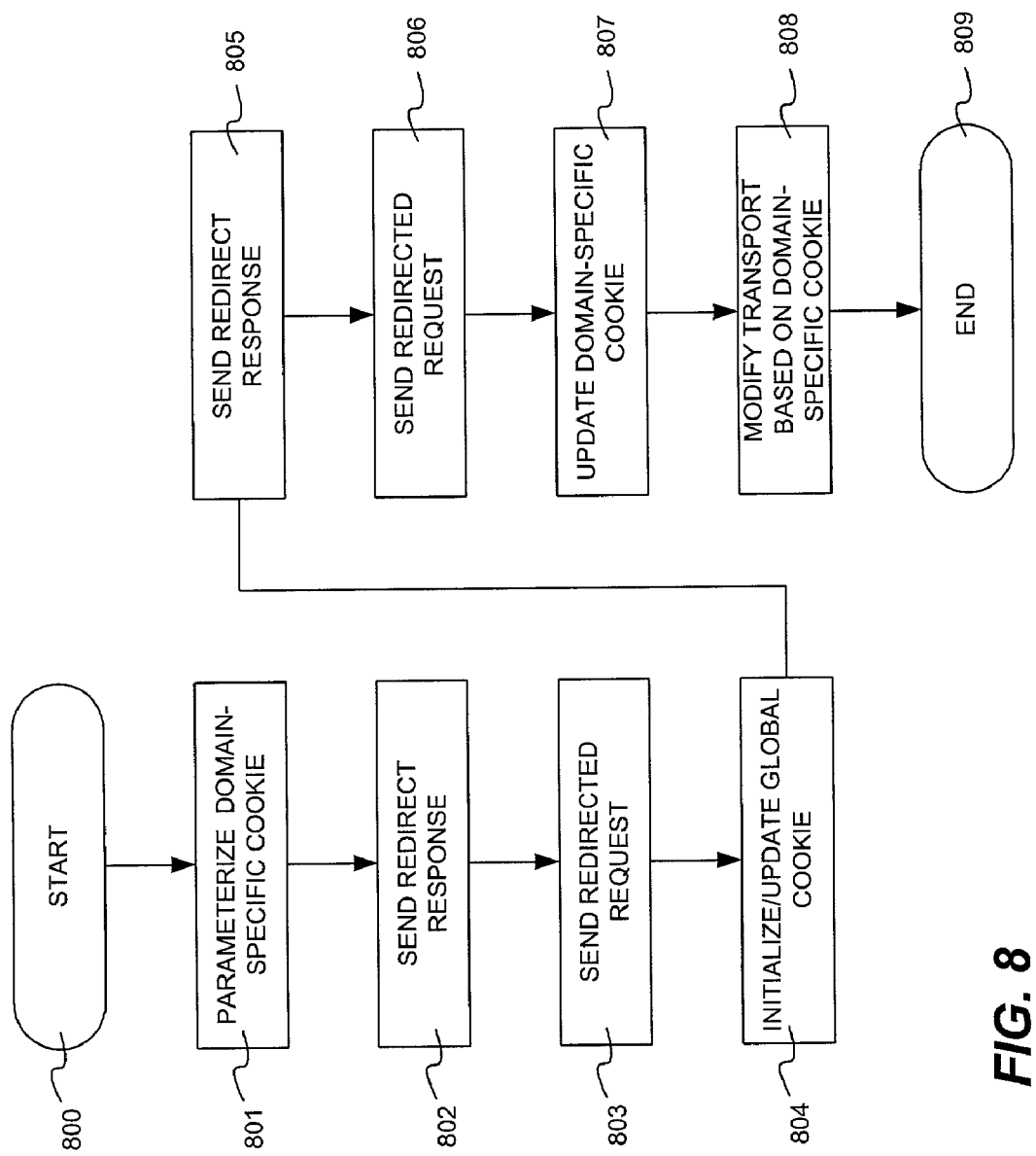
FIG. 8 shows a detailed flow chart representing a particular process in accordance with the present invention.

FIG. 8 shows a detailed flow chart representing a processes 702 that create a domain-specific cookie in accordance with the present invention, initiated at step 800. This function is initiated by the front-end when it receives a request front user-agent that does not include a domain-specific cookie including information intended for front-end 201. At step 801, front-end 201 generates origin based parameter data. This origin data may be in the form of a "zero cookie" which is essentially an empty data structure. Alternatively, the parameter data may include a URL for origin server 210, a subdirectory of origin server 210, or a particular document requested from origin server 210. Front-end 201 may have stored knowledge of priorities associated with particular content, or may obtain such knowledge by reference to front-end manager 207.

At step 802, front-end 201 redirects user agent 205 to state management server 206. In addition to providing the URL of the state management server 206, front-end 201 additionally provides the parameter data generated during step 801.

At step 803, user agent 205 submits a request for state management server 206. This request includes the parameter data containing the domain-specific state information as disclosed above. Additionally, this request includes global priority information maintained on user agent 205 device, such as a cookie intended for the domain of state management server 206. The global cookie comprises cross-domain priority information relating to content requested by user agent 205 from a plurality of domains.

At step 804, state management server 206 determines priority for user agent 205 based on both the received parameter data and the information from the global cookie. Information stored in the global cookie includes cumulative user-specific and content-based priority information. Specifically, the global cookie includes content-based information because the system monitors the priority associated with the content requested by user agent 205 as explained in greater detail in relation to FIG. 9. Furthermore, the global cookie includes user-specific information because the global cookie is associated with a particular client device. The fact that several people may use a single client device and, therefore, be associated with the same global cookie is a limitation inherent with cookies. Some devices and/or operating systems may allow for multiple profiles and, accordingly, may maintain separate cookie sets for each profile. It is anticipated that innovations that allow user agent 205 to actually uniquely identify a user to a server can be used in accordance with the present invention in place of the current state maintenance mechanisms offered by cookies.

Based on the priority information contained in the global cookie and the parameter data, the state management server 206 determines an initial priority for user agent 205 at front-end 201, wherein front-end 201 is receiving requests on behalf of origin server 210. For example, if origin server 210 has categorized itself as a book website, this category is received by state management server 206 as parameter data in a request from user agent 205. Additionally, state management server 206 receives the global cookie from user agent. The global cookie contains priority information for a plurality of categories including a book category. This priority information is preferably based on user agent's 205 browsing history. state management server 206 determines the priority for user agent 205 for the book category.

At step 805, state management server 206 redirects user agent 205 to front-end 201. This redirection preferably sets a global cookie value in user agent 205. In one embodiment, state management server 206 includes the priority information for each of the relevant categories as parameter data in the redirection response. In another embodiment, state management server 206 provides a single initial priority value for user agent 205 at origin server 210. In this second embodiment, if origin server 210 is categorized in a plurality of categories, state management server 206 may determine an aggregate user priority value based on priority values associated with each of the categories and a weighting function between the different categories.

Additionally, state management server 206 may provide other information, including a hit count interval. A hit count interval identifies the condition that triggers a global cookie update function as described in greater detail in relation to FIG. 10. In a preferred embodiment, the hit interval is a number of explicit requests for content by a user operating user agent 205.

At step 806, user agent 205 sends the redirected request to front-end 201, including the updated parameter information corresponding to the domain-specific cookie. It should be noted that at this juncture the non-updated domain-specific cookie is also sent with the redirected request in step 806, however, this non-current state information is likely ignored by most processes.

At step 807, front-end 201 updates its own records of the domain-specific cookie value. This updated information can be stored in front-end 201 awaiting an opportunity to write the updated cookie back to the associated user agent 205 when a response to the request is sent. Alternatively, front-end 201 may immediately write the cookie back in the form of another redirect requests, with a set cookie, with the redirection pointed to itself.

At step 801, front end 201 prioritizes user agent 205 based on the priority determined in step 807. In one embodiment, this priority affects factors such as the quality of service provided to requests from user agent 205, reliability of transmissions from user agent 205, queue order for transmission across virtual network 200 by front-end 201, and other factors. At step 807, the function terminates.

Figure 9:
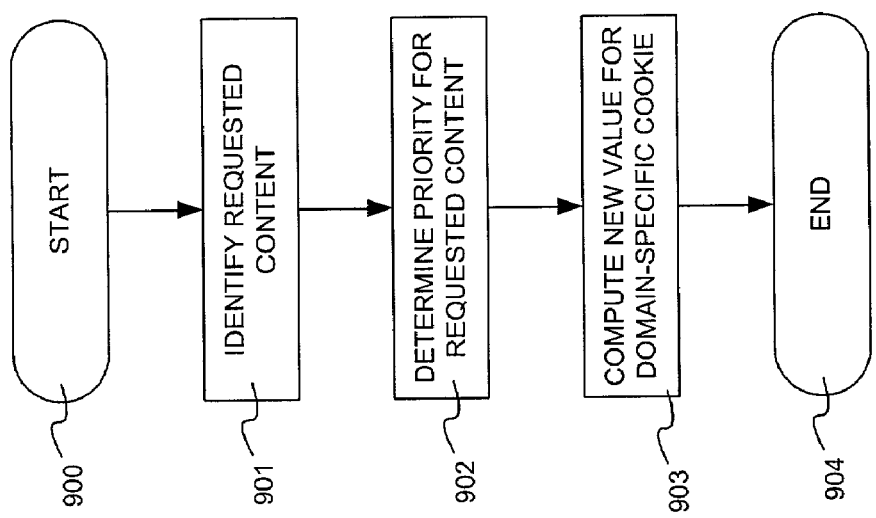
FIG. 9 shows a detailed flow chart of a domain-specific cookie update.

FIG. 9 shows a detailed flow chart representing a domain-specific cookie update function 703. At step 900, the function is initiated upon receipt of a request at front-end 201 from user agent 205 for content from origin server 210. As described in FIG. 7, the request either includes a domain-specific cookie or is a default cookie created during step 702. At step 901, front-end 201 parses and analyzes the requested content. In a preferred embodiment, step 901 determines whether the received request was explicitly generated by a user associated with user agent 205 (e.g., clicking on a hyperlink or otherwise inputting a URL) as opposed to implicitly requested (e.g., requested by user agent 205 in response to a command from a server or an explicit request by the user). In this embodiment, only explicit requests are monitored during step 901, but in alternative embodiments other requests, including implicit requests, may be monitored.

At step 902, front-end 201 identifies whether a basis for assigning a priority to the content exits. A priority basis may exist within the request itself, but more practically resides in the responses that include the content. The responses may come from a cache within front-end 201, or may come from a back-end 203 or server 210 itself. This priority information may be established by an administrator of origin server 210 and maintained on front-end 201 as well as all or some other front-ends 201, but is preferably stored in a back-end 203 associated with the server 210.

The domain-specific cookie aggregates priority information over a plurality of web site visits, so a priority value stored in the domain-specific cookie can be used to prioritize front-end to back-end transport even without a priori knowledge of the content. It should be understood that the processes shown in FIG. 9 illustrate to logical processes in updating the domain-specific state information and are therefore somewhat independent of the processes involved in using the state information to prioritize traffic. Hence, these processes may occur after the content is retrieved so that transport prioritization of the current request/response traffic is based on pre-existing state information, whereas prioritization of subsequent request/response traffic to this domain will be based on the updated state information.

At step 903, the basis information identified in step 902 is used to determine a priority value for the requested content. In a particular embodiment, each web page is associated with a content priority value ranging from 0–4. This content priority value is embedded in pages returned from a back-end 203 to a front-end 201 in a manner that is readable by front-end 201.

In one embodiment, the content priority value (e.g., a value ranging from 0–4) is stored in a database within front-end 201, and may be stored with a cached copy of the content itself. This allows a front-end 201 to lookup the priority value based on the parsed URL. In another embodiment, the content priority value is stored in a back-end 203, and is returned to front-end with the requested content. Advantageously, when content is returned from back-end 203 the priority of each link within the returned content has a priority specified, for example by rewriting the link to include a code specifying the priority. In this manner, subsequent priority information is available to the front-end 201 before the content is retrieved so long as the user is following links in a page already delivered.

It is contemplated that a default content priority value may be established for different kinds of content. For example, any content with a file name "index.html" may be given a default priority of "3" whereas a file with an extension ".gif" be given a default priority of 0 to preferentially transfer hyperlinked documents, which will lead to further requests, over graphics files. Also, any request that relates to a secure page (e.g., using the secure HTTP URL scheme) may be assigned a high priority value of 4 by default. Assignment of a default priority to secure pages is important because the URL is encrypted by the user agent 205 and cannot be parsed by front-end 201 to enable other prioritization methods.

This priority information, whether stored at a back-end 203, front-end 201 or elsewhere, may map each document maintained on origin server 210 to a particular priority value (e.g., document "Buy.html" may have a high priority). Additionally, the priority information may map directories to a particular priority value (e.g., all documents in the "/Sales" directory have a high priority). Also, the priority information may map particular types of documents to a particular priority value (e.g., all active server page documents are high priority). A combination of the above techniques and other techniques could also be used during step 903.

At step 904, the priority for the request is computed and stored. In a particular embodiment, the content priority value for each web page that is requested is converted to a "page credit". This process allows higher priority pages to have a stronger influence on the effective priority computed later. The conversion to page credits can be performed with a simple look-up table shown in Table 1:

TABLE 1

| Content Priority | Credits per page viewed |
|---|---|
| 0 | 0 |
| 1 | 1 |
| 2 | 2 |
| 3 | 5 |
| 4 | 20 |

Each time a page with a content priority of 4 is viewed, a credit of 20 is added to the "page credits" field of the domain-specific state information. The credit per page viewed may be altered to affect the desired influence on the effective priority value. In this manner, the domain user priority information can be used to identify a user that views many high-priority pages on a number of web sites 210 (e.g., a frequent purchaser) even if the particular user has never visited a particular site 210.

In one embodiment, updated domain-specific state information is appended to the response returned to user agent 205 using a conventional set-cookie response header. When origin server 210 has provided cookie information as well, front-end 201 passes the origin server cookie to user agent 205. In another embodiment, the domain-specific cookie is updated prior to transmission of the request to back-end 203, when the content priority can be determined without reference to back-end 203. At step 904, the domain-specific cookie update function terminates. The priority data collected during the domain-specific cookie update function may be used to modify the user-specific, content-based priority value, or this priority may be updated only periodically during a global cookie update function, as described below.

Figure 10:
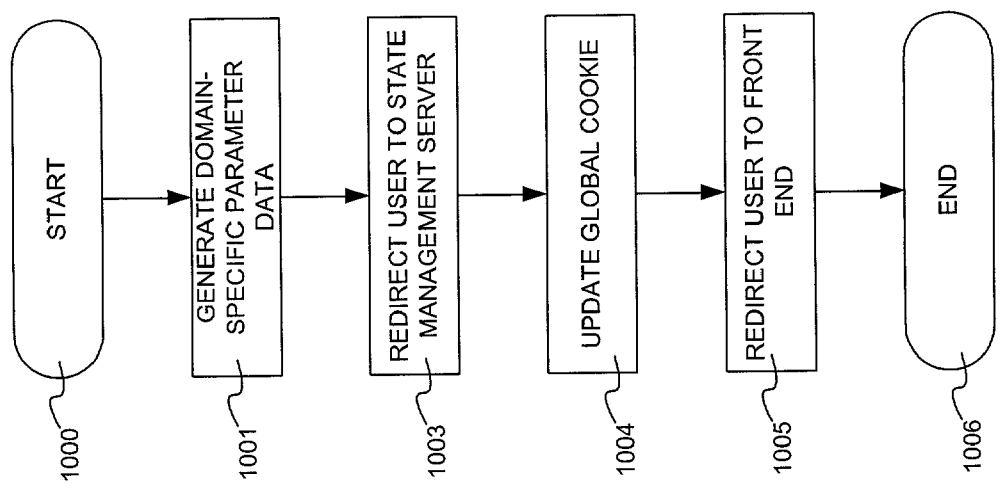
FIG. 10 shows a detailed flow chart of a global cookie update.

FIG. 10 shows a detailed flow chart representing a global cookie update function. The global cookie stores cross-domain state information, and so the functions shown in FIG. 10 accomplish a transfer of state information from various dynamically assigned domains to the statically defined domain in which state management server 206 operates. At step 1000, the global cookie update function is initiated. This function is preferably initiated upon the occurrence of a predetermined condition, such when the number of pages retrieved from to a particular domain during an interval exceeds a specified threshold. An interval may be defined in absolute terms such as days or weeks, or may be defined as the elapsed time since the last update of the global state information. In essence, the global cookie update processes cause a specific domain to "check-in" its domain-specific cookie with the state management server 206.

Additionally, the system may delay the start of this function until some time or event after the occurrence of a predetermined condition. For example, if the predetermined condition occurs, and user agent 205 is in the process of completing a sales transaction, front-end 201 may delay the global cookie update function until the transaction is completed, a time when the front-end 201 is less busy, or another event. Additionally, the system may provide a user operating user agent 205 an option of whether to initiate the function. For example, upon the predetermined condition occurring, front-end 201 may transmit a response to user agent 205 including an explanation of the pending update function and an opportunity to complete the function now, later, or not at all. Additionally, user agent 205, origin server 210 and/or front-end 201 may have rules that define when, whether and how this function is to be initiated.

At step 1001, front-end 201 converts the domain-specific state information into one or more parameter(s) This parameter data is determined based on information contained in the domain-specific cookie for origin server 210. Accordingly, the parameter data reflects the aggregated priority associated with the content explicitly requested by user agent 205 of origin server 210 via front-end 201 or any other front-end 201 in the particular embodiments described herein. The identity of front-end 201 is also included as a parameter, by including the dynamically assigned domain, or IP address of the front-end 201 currently dynamically hosting the domain, as a parameter.

At step 1002, front-end 201 redirects user agent 205 to state management server 206. The redirection command includes the parameters determined in step 1001, and either an implicit or explicit redirection information as described hereinbefore. At step 1003, user agent transmits a redirected request to state management server 206. The request includes the parameter data generated in step 1001. Additionally, the request includes any state information stored within a global cookie, which is maintained within the domain of state management server 206.

At step 1003, state management server 206 updates the global cookie for user agent 205 based on the parameter data and the priority information contained in the global cookie. This process includes, for example, logical or mathematical combination of the global state information with the domain-specific state information. This process also includes resetting the domain-specific state information to indicate that it has checked in with state management server 206 by, for example, setting the "hits this interval" to zero. Moreover, the user priority may be updated and/or the credits this interval value may be reset to zero or to a preselected value to give the user a head start in this domain.

At step 1004 user agent is redirected to front-end 201. The redirection command includes a redirection to the host domain derived from the parameter information passed originally from user agent 205. The redirection command includes a set-cookie command to update the global cookie with the updated global state information. The redirection command also includes updated domain-specific state information as a parameter. User agent 205 then follows the redirection command to re-connect to front-end 201.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for exchanging domain-specific state information with a plurality of user agents, the system comprising:
   an intermediary computer having an interface for communicating with user agents over a network, the intermediary computer having a first process running within a dynamically assigned domain and a second process running within a statically assigned domain, wherein the first process within the dynamically assigned domain implements a gateway specific to a current agent request and the statically assigned domain is associated with an implicit web server implemented at the same network address as the first process.

2. The system of claim 1 wherein the first process comprises methods for converting domain-specific state information associated with the dynamically assigned domain into a parameter and communicating the parameter to the second process.

3. The system of claim 1 wherein the second process includes methods for receiving domain-specific state information associated with the dynamically assigned domain as a parameter.

4. The system of claim 3 wherein the second process includes methods for receiving domain-specific state information associated with the statically assigned domain.

5. The system of claim 4 wherein the second process includes methods for combining the domain-specific state information associated with the dynamically assigned domain with the domain-specific state information associated with the statically assigned domain to develop cross-domain state information.

6. The system of claim 5 wherein the second process includes methods for storing the cross-domain state information as a cookie within the statically assigned domain in the user agent.

7. The system of claim 1 wherein the statically defined domain is associated with an explicit web server.

8. The system of claim 1, wherein the methods for communicating the parameter further comprise methods for sending an HTTP redirect request to the user agent wherein the redirect request includes an identification of the statically assigned domain, the parameterized domain-specific state information, and a parameter indicating the dynamically assigned domain.

9. The system of claim 1 further comprising methods within the first processes operable to read the domain-specific state information to determine based at least in part on the domain-specific state information when to communicate the domain-specific state information to the second process.

10. A system for exchanging domain-specific state information with a plurality of user agents, the system comprising:
   an intermediary computer having an interface for communicating with user agents over a network, the intermediary computer having a first process running within a dynamically assigned domain and a second process running within a statically assigned domain,
   wherein the first process within the dynamically assigned domain implements a gateway specific to a current agent request and the statically assigned domain is associated with an implicit web server implemented at the same network address as the first process, and wherein the first process comprises methods for converting domain-specific state information associated with the dynamically assigned domain into a parameter and communicating the parameter to the second process.

11. A system for exchanging domain-specific state information with a plurality of user agents, the system comprising:
an intermediary computer having an interface for communicating with user agents over a network, the intermediary computer having a first process running within a dynamically assigned domain and a second process running within a statically assigned domain,
wherein the second process includes methods for receiving domain-specific state information associated with the dynamically assigned domain as a parameter, and
wherein the second process includes methods for receiving domain-specific state information associated with the statically assigned domain.

12. The system of claim 11, wherein the first process comprises methods for converting domain-specific state information associated with the dynamically assigned domain into a parameter and communicating the parameter to the second process.

13. The system of claim 11, wherein the second process includes methods for combining the domain-specific state information associated with the dynamically assigned domain with the domain-specific state information associated with the statically assigned domain to develop cross-domain state information.

14. The system of claim 13, wherein the second process includes methods for storing the cross-domain state information as a cookie within the statically assigned domain in the user agent.

15. The system of claim 11, wherein the statically defined domain is associated with an explicit web server.

16. The system of claim 11, wherein the methods for communicating the parameter further comprise methods for sending an HTTP redirect request to the user agent wherein the redirect request includes an identification of the statically assigned domain, the parameterized domain-specific state information, and a parameter indicating the dynamically assigned domain.

17. The system of claim 11, further comprising methods within the first processes operable to read the domain-specific state information to determine based at least in part on the domain-specific state information when to communicate the domain-specific state information to the second process.

18. The system of claim 11, wherein the first process within the dynamically assigned domain implements a gateway specific to a current agent request and the statically assigned domain is associated with an implicit web server implemented at the same network address as the first process.

* * * * *